United States Patent [19]
Fieni

[11] 3,976,305
[45] Aug. 24, 1976

[54] SAFETY BELT ASSEMBLY FOR A MOTOR VEHICLE

[75] Inventor: Walter Fieni, Paris, France

[73] Assignee: Societe Anonyme Francaise du Ferodo, Paris, France

[22] Filed: Jan. 26, 1972

[21] Appl. No.: 220,809

[30] Foreign Application Priority Data
Feb. 3, 1971   France .............................. 71.03591

[52] U.S. Cl. ............................................... 280/744
[51] Int. Cl.² .......................................... B60R 21/02
[58] Field of Search .................. 280/150 SB; 180/82

[56] References Cited
UNITED STATES PATENTS
3,583,726   6/1971   Lindblad ...................... 280/150 SB
3,684,310   8/1972   Weststrate .................... 280/150 SB
3,690,696   9/1972   Lincoln ......................... 280/150 SB Primary Examiner—Robert R. Song
Attorney, Agent, or Firm—Charles E. Temko

[57] ABSTRACT

A safety belt assembly for a motor vehicle. The safety belt has a shoulder strap and a transverse strap and is anchored at at least one outer point on the adjacent door and an inner point on the vehicle body per se. A pneumatically or hydraulically operable variable length arm for lengthening and shortening the belt is responsive to movement of the door for applying the seat belt onto the occupant of the seat upon closing of the door and for freeing the occupant and the seat upon opening of the door.

8 Claims, 5 Drawing Figures

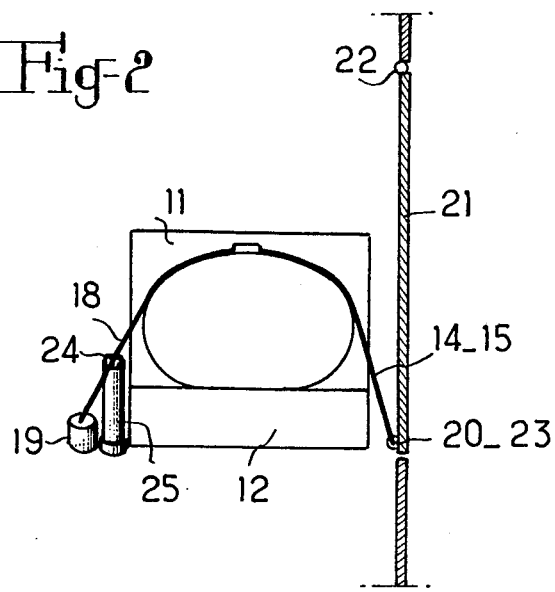
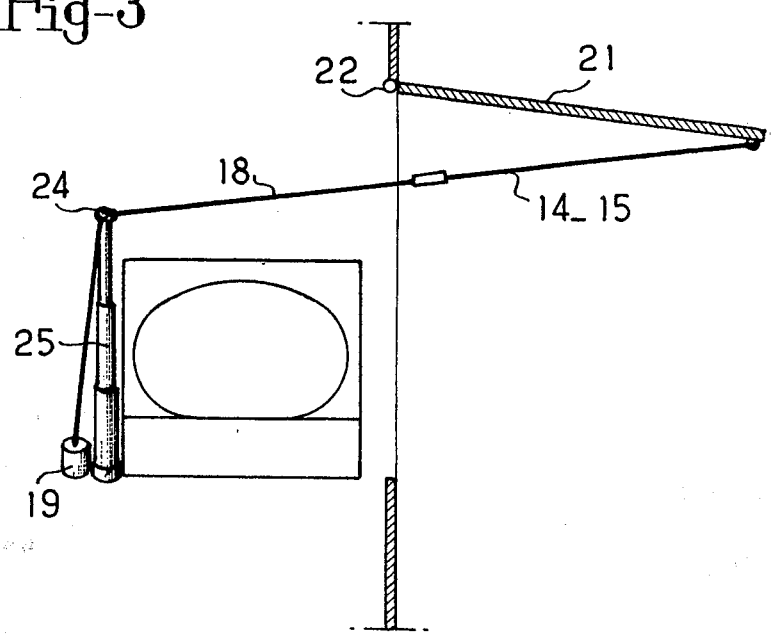

SAFETY BELT ASSEMBLY FOR A MOTOR VEHICLE

Applicant claims the priority date of Feb. 3, 1971, based upon French application Ser. No. 7,103,591 in the name of the present assignee of this application.

BACKGROUND OF THE INVENTION

The invention relates to a device for a safety belt for an occupant of a vehicle, in particular a motor vehicle.

A safety belt must respond to considerably varied conditions, certain of which are contradictory : the safety belt must effectively hold the occupant in a seat of the vehicle with which it is fitted but enable the occupant to take or leave his seat.

The invention concerns safety belts with two anchoring points that is an outer anchoring point and an inner anchoring point, i.e., safety belts of the so-called shoulder type or the transverse type. The invention also applies to safety belts with three anchoring points, that is two outer anchoring points, and an inner anchoring point from which the straps extend, the straps being known as the shoulder strap, the transverse strap and the common strap respectively. In certain constructions the outer anchoring point(s) is connected to the vehicle door. During the opening of the door, the belt itself moves away from the seat so that not only is access to the seat possible, but the passenger does not have to carry out any particular manipulation of the belt in order to apply the same when he takes his seat or when he leaves his seat.

Up to now such access to the seat has not been easy and the passenger in the majority of cases has had to remove the belt by hand from the seat after opening the door in order to enable entry and exit to and from the vehicle.

SUMMARY OF THE INVENTION

The device for a safety belt according to the present invention overcomes this drawback.

According to an object of the present invention the opening of the vehicle door causes the strap connected to the inner anchoring point to move away from the seat.

A more particular object of the present invention consists in a safety belt including a reeling and unreeling device with locking means known per se, provided for lengthening the belt in order to facilitate the movements of the passenger of a vehicle equipped with such a seat belt comprising, in combination, resilient return means for enabling the temporary lengthening of the belt by reeling and unreeling and means controlled by the opening of the vehicle door for effecting the lengthening of the belt.

According to a preferred embodiment, the last mentioned means comprises a variable length arm one end of which is fixed to the vehicle body, preferably in the vicinity of the inner anchoring point for the belt, the other movable end comprises a slide co-operating with the inner strap of the belt ; in this case, the contracted position of the arm corresponds to the operative position of the seat belt.

The arm is advantageously telescopic and preferably actuated by fluid under pressure upon the opening of the vehicle door.

The same arm may be provided for co-operating with the two seat belts of the two front seats of a motor vehicle.

BRIEF DESCRIPTION OF THE DRAWINGS

In the description which follows, made by way of example, reference is made to the accompanying drawings, in which:

FIG. 2 is a top view for a first position;

FIG. 3 is a view similar to that of FIG. 2 but for another position;

DESCRIPTION OF A PREFERRED EMBODIMENT

Figure 1:
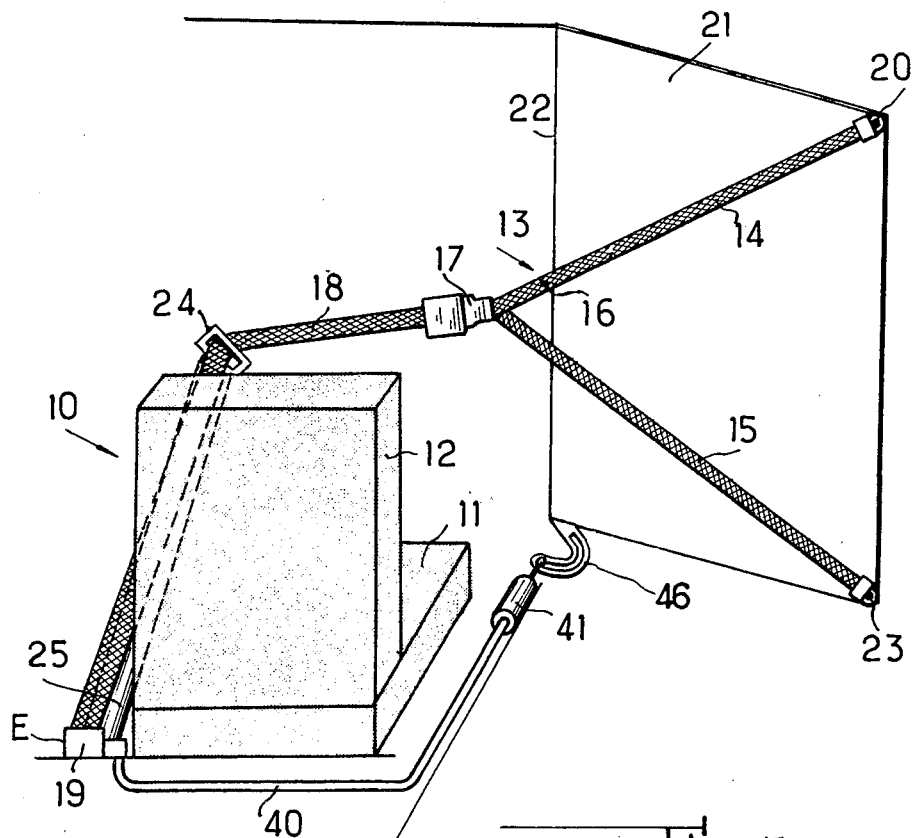
FIG. 1 is a schematic perspective view from the rear of a device according to the invention provided for a seat of a motor vehicle.
Figure 4:
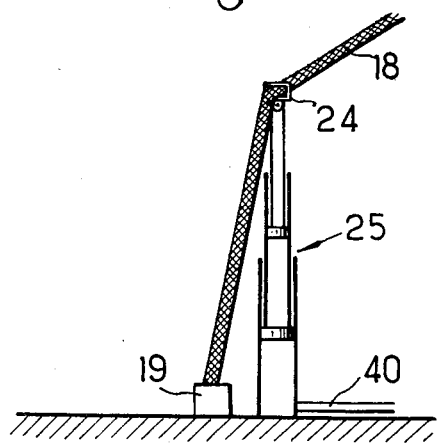
FIG. 4 is an elevation view of a part of the assembly according to the invention.

The seat 10 of a vehicle (FIG. 1) comprises a bench portion 11 and a backrest 12 and is provided with a safety belt 13 which comprises a shoulder strap 14 a transverse strap 15, generally formed by a single strap 16 and connected with a buckle 17, and the third or common strap 18 having its end remote from that fixed to the buckle 17 connected to an inner lower anchoring point 19. The end of the strap 14 opposite the buckle 17 is connected to an upper anchoring point 20 provided on the vehicle door 21 mounted by hinges about an axis 22 located at the inner edge of the door 21 in the present embodiment. The end of the strap 15 opposite the buckle 17 is connected to a lower anchoring point 23 which is, for example, in substantially vertical alignment with the upper anchoring point 20.

A reeling and unreeling device E is provided at one of the anchoring points, for example the anchoring point 19 which enables the lengthening of the seat belt which moves away from the seat 10 when the occupant leaves or takes his seat, resilient return means being provided to return the safety belt to its position in which the safety belt is applied against the body of the occupant for retaining him in his seat, or against the seat when the seat is empty. A locking of the unreeling device is obtained in the case of shock in order that the safety belt performs its intended function.

Figure 5:
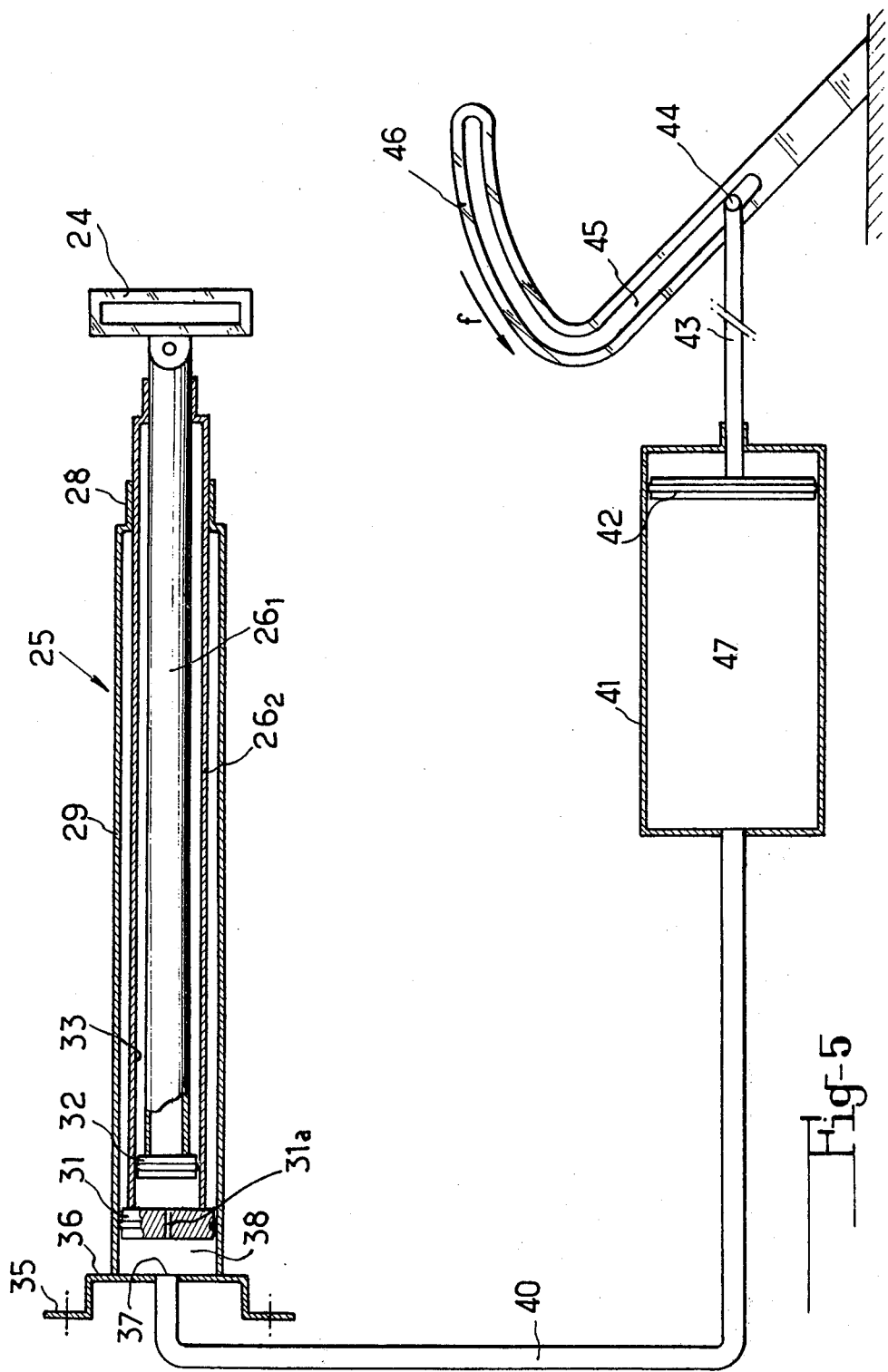
FIG. 5 is a view partially in section of an actuating mechanism for the device according to the invention.

The common strap 18 passes through a link 24, advantageously pivotally mounted at the outer end of an arm of variable length comprising a plurality of elements $26_1$, $26_2$, etc. (FIG. 5) received within one another telescopically, the outer element $26_n$ ($26_2$ in the illustrated embodiment) is guided in a collar 28 provided on a cylinder 29 which co-operates with a piston 31 having an orifice $31_a$ integrally formed with the outermost element. The element $26_p$ is integrally formed with a piston 32 co-operating with the interior surface 33 of the element $26_{p+1}$.

The cylinder 29 is mounted on a base 36 which is fixed to the body of the vehicle by a support plate 35 and has a port 37 for enabling communication of the chamber 38 inside the cylinder 29 with a conduit 40 coming from a control cylinder 41 having a piston 42 with a rod 43 the free end of which is provided with a follower 44 co-operating with a slot 45 arranged in a crank-shaped lever 46 rotatably movable in the direction of the arrow f when the door opens and in the opposite direction when the door closes. The combination formed by the chamber 47 of the cylinder 41, the conduit 40, the chamber 38 and the chamber connected thereto by the ports 31a provided each piston 31 is filled with a gas or a liquid.

OPERATION OF THE PREFERRED EMBODIMENT

When the vehicle is in operation the occupant of the seat 10 is maintained by the seat belt 13 having three anchoring points as usual, the position being shown in FIG. 2. In case of impact, the reeling and unreeling device E is locked, the safety belt opposes the forward displacement of the occupant's body and prevents the same from being thrown against the windshield and/or the dashboard.

When the vehicle has stopped and the occupant desires to get out of the vehicle, he opens the door: the pivoting of the door about its hinges moves the straps 14 and 15 from the body of the occupant, and simultaneously the rotation of the lever 46 in the direction of the arrow f by means of the pneumatic or hydraulic circuit causes the elongation of the arm 25, which is very short in its contracted position by the telescoping of the elements 26 in one another, moving the strap 18 from the body of the occupant until it reaches the position shown in FIG. 3. The lengthening of the belt is made possible by use of the reeling and unreeling device E with progressive tensioning of the resilient return means which it is provided when the strap position or the like is unreeled. The pivotal mounting of the link on end arm 25 enables the variable orientation of the link with respect to the arm thus avoiding any excessive wear of the strap or the like by friction.

The occupant of the seat is thus totally freed from his seat belt by merely opening the door so that he can get out of the vehicle without any manipulation of the seat belt.

Once the passenger has gotten out of the vehicle and closed the door, the belt returns to its contracted position under the combined effects of the resilient return means of the reeling and unreeling device and the suction or exhaust produced in the pneumatic or hydraulic circuit following the rearward movement of the piston 42 driven by the rotation of the crank-shaped lever 46 in the direction opposite that shown by the arrow f.

In order to return to his seat the passenger opens the door of the vehicle, the safety belt once again enables access to the seat, as previously described, and the passenger sits down without difficulty, the closing of the door assures the application of the safety belt against the body of the occupant which is thus protected without any manipulation of the safety belt whatsoever.

In an embodiment the same extensible arm is provided for both of the safety belts of two adjacent seats in a motor vehicle.

The invention also applies to a safety belt which is not provided with a buckle for opening and closing or to a safety belt comprising other means for removing an occupant in case of an accident after the safety belt has effected its retaining function.

The reeling and unreeling device may be arranged at a position other than in the vicinity of the inner anchoring point.

Likewise any control other than a pneumatic control may be envisaged for actuating the transmission means causing the moving away of the safety belt relative to the seat of the vehicle when the door adjacent the seat is opened.

What I claim is:

1. A safety belt assembly for use in a motor vehicle having a seat and a door hinged to a vehicle frame comprising: a seat belt having a generally Y-shaped configuration with a common strap anchored at one end thereof to an inboard structural portion of the vehicle frame, a shoulder strap and a transverse strap secured to the rearward free edge portion of said door at two vertically spaced points thereon and to said common strap at a second end thereof variable length means secured at one end to a second inboard portion of the vehicle frame and attached at its other end to an intermediate portion of said common strap for displacing such common strap away from said seat in response to the opening of said door and toward said seat in response to the closing of said door, and means for controlling said last mentioned means responsive to the opening and closing of said door.

2. Structure in accordance with claim 1, in which said variable length means is a variable length arm interconnecting said common strap and said vehicle frame.

3. Structure in accordance with claim 2, including a guiding member pivotally mounted on an end of said arm remote from said vehicle frame through which said common strap passes.

4. Structure in accordance with claim 2, in which said arm is telescopic.

5. Structure in accordance with claim 4, in which the elongation and contraction of said arm is fluid operated.

6. Structure in accordance with claim 4, in which elongation of said telescopic arm causes said belt to be moved away from said seat.

7. Structure in accordance with claim 1, in which said control means comprising a pneumatic system including a cylinder and piston unit operatively connected to said variable length means, and lever means attached to the piston at one end and to said door at an opposite end for displacing said piston in response to the opening and closing of said door.

8. Structure in accordance with claim 1, further comprising reeling and unreeling means for said belt enabling the lengthening of said belt as it is moved away from said seat.

* * * * *